Aug. 1, 1939.   C. G. STRANDLUND   2,168,004
COLTER
Filed Aug. 1, 1938
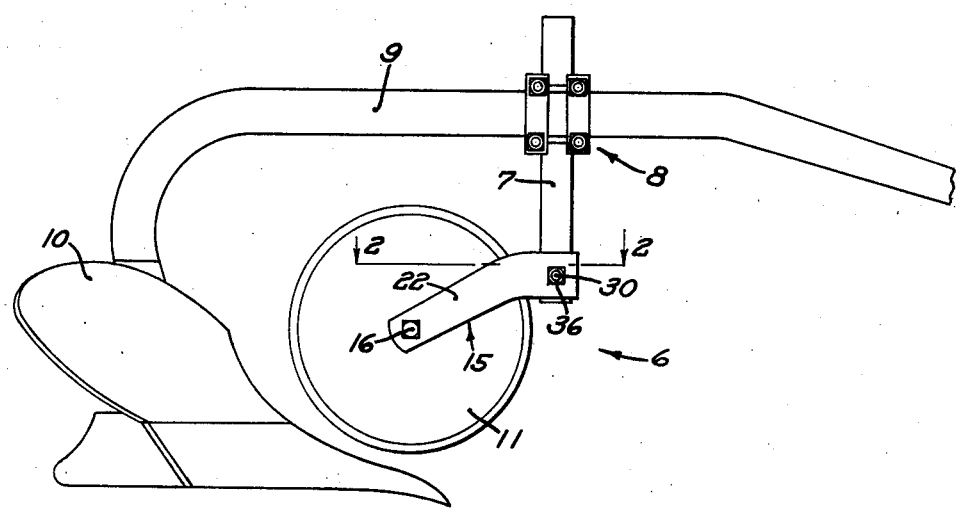
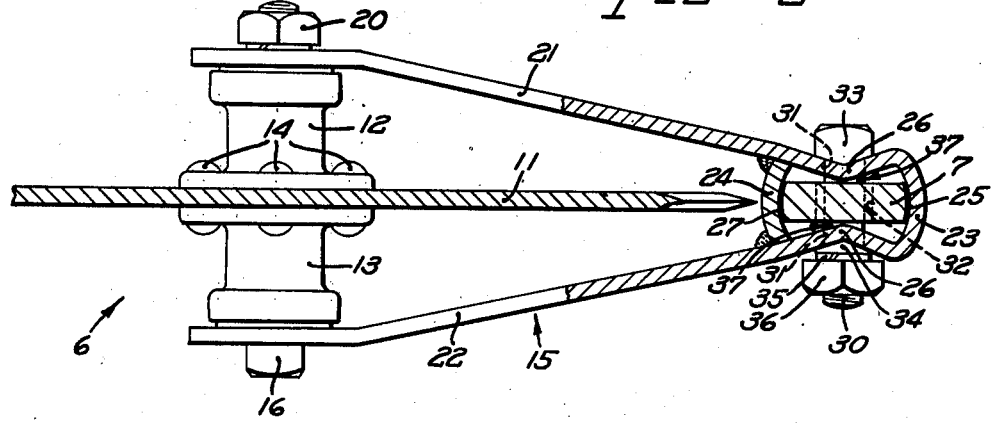
INVENTOR.
CARL G. STRANDLUND
ATTORNEYS

UNITED STATES PATENT OFFICE 2,168,004

COLTER

Carl G. Strandlund, Moline, Ill., assignor to Deere & Company, Moline, Ill., a corporation of Illinois Application August 1, 1938, Serial No. 222,397

11 Claims. (Cl. 97—209)

The present invention relates to plow colters and has as its principal object the provision of an improved colter support in which the colter blade is allowed a limited amount of lateral swinging to enable it to pass to one side of rocks or other obstacles which might otherwise damage the blade. Another object of the present invention is to provide a colter yoke which may be easily and cheaply manufactured from bar stock by bending the same into shape, thereby eliminating the more costly castings or forgings which have heretofore been required for such a swiveled connection.

Another object is to provide a swivel connection between the colter yoke and shank which may be easily tightened to take up for wear and thereby greatly increase the life of the yoke.

These and other objects and advantages of the present invention will become readily apparent after a consideration of the following detailed description of the preferred embodiment thereof together with the appended drawing, in which Figure 1 is a side elevation of a colter embodying the principles of my invention; and Figure 2 is a sectional view taken along the line 2—2 in Figure 1.

Referring now to the drawing, the rolling colter, which is designated in its entirety by the reference numeral 6, comprises a substantially vertical shank 7 of generally rectangular cross section which is clamped in any usual manner at 8 to the beam 9 of a conventional moldboard plow 10. The colter 6 includes a circular disk 11 having a cutting edge sharpened on the periphery thereof, which is disposed between two hub portions 12, 13 and rigidly secured thereto by rivets 14. The hub is journaled on suitable bearing means and is supported between the rear ends of a forked yoke 15 by a bolt 16 that passes through aligned apertures in the hub portions 12, 13 and yoke 15 and is secured by a nut 20 on the threaded end thereof.

The yoke 15 is preferably formed of bar steel or other pliable metal bent into the general shape of a U having spaced arms 21, 22 adapted to receive the shank 7 therebetween, and an arcuate portion 23 at the closed end thereof. The front edge of the shank 7 is rounded at 25 and bears against the inner face of the arcuate portion 23. The rear edge of the shank is also rounded, as at 27, and bears against the inner face of a curved bracing member 24 which is fixed, as by welding, between the arms 21, 22. Both curved portions 23 and 24 are arcuate about the axis of the shank 7 and thus provide a journal fit allowing free lateral swinging of the yoke relative to the shank but restraining vertical swinging therebetween.

The arms 21, 22 are pinched together, as at 26, providing a pair of opposed fulcrums which are adapted to bear against the flat sides of the shank 7 when the yoke 15 turns relative thereto. A bolt 30 is passed through aligned bolt holes 31 in the fulcrum portions of the yoke and an enlarged opening 32 in the shank 7 to hold the yoke in a fixed vertical position relative to the shank while at the same time allowing lateral swinging within the limits defined by the fulcrums 26. The bolt head 33 is wedge-shaped on its under side to fit snugly down into the angle formed in the back of the adjacent fulcrum 26. A wedge-shaped washer 34 on the other end of the bolt 30 fits down into the angle formed by the other fulcrum and provides a flat base for a lock washer 35 and nut 36. A limited amount of clearance is provided at 37 between the points of the fulcrums 26 and the sides of the shank 7 to allow the yoke to swing freely between the fulcrums, and the amount of clearance at 37 is regulated by the bolt 30 and nut 36. When the nut 36 is tightened, the two fulcrums, being somewhat flexible, are drawn together, diminishing the clearance at 37 and taking up any looseness that develops from wear.

The colter support shown and described herein provides a substantial means for connecting the yoke to the shank, allowing the full extent of lateral vibration necessary to dodge around obstacles which might otherwise damage the blade, but without allowing the colter to swing around to an undesirable extent. Another advantage of this construction is that it can be easily and cheaply manufactured from bar stock which can be bent into the shape shown, and the cross piece 24 welded in place. It has the further advantage of being long lived, and as wear develops excessive clearance at 37, it can be taken up by tightening nut 36 on bolt 30.

What I claim is:

1. A colter support comprising a shank, a yoke comprising a pair of spaced arms having inwardly directed fulcrums adjacent one end of the yoke, said fulcrums and said shank having aligned holes therein, means for connecting the shank between said arms comprising a bolt disposed in said holes and adapted to draw said fulcrums together toward the sides of said shank, meanwhile permitting limited lateral swinging of said yoke relative to said shank, and means for restraining swinging of said yoke about the axis of said bolt.

2. A colter support comprising a shank of generally rectangular cross section and a yoke consisting of a flexible U-shaped bar having a pair of spaced arms adapted to receive said shank therebetween, said arms having inwardly directed fulcrums adjacent the closed end of the yoke, said fulcrums and said shank having aligned holes therein, means for connecting the shank between said arms comprising a bolt disposed in said holes and adapted to draw said fulcrums together toward the sides of said shank, meanwhile permitting limited lateral swinging of said yoke relative to said shank, the closed end of said U-shaped bar being arcuate, and one edge of said shank being in contact with said arcuate portion whereby the swinging of said yoke about the axis of said bolt is restrained.

3. A colter support comprising a shank of generally rectangular cross section and a yoke consisting of a flexible U-shaped bar having a pair of spaced arms adapted to receive said shank therebetween, said arms and said shank having aligned holes therein, a bolt disposed in said holes and adapted to draw the arms of said U-shaped bar together toward the sides of said shank when tightened, said U-shaped bar having portions thereof relieved to permit lateral swinging of the yoke relative to said shank, the closed end of said U-shaped bar being arcuate, and one edge of said shank being in contact with said arcuate portion whereby the swinging of said yoke about the axis of said bolt is restrained.

4. A colter support comprising a shank of generally rectangular cross section and a yoke consisting of a flexible U-shaped bar having a pair of spaced arms adapted to receive said shank therebetween, said arms being bent inwardly toward each other adjacent the closed end of said bar and adapted to bear against the sides of said shank, a cross bracing member disposed between and fixed to the arms of said U-shaped bar, the closed end of said bar and said cross bracing member being arcuate about the axis of said shank and in contact with the edges thereof, said shank and said inwardly bent portions of the arms having aligned holes adapted to receive a connecting bolt for drawing said arms toward the sides of said shank.

5. A colter support comprising a shank of generally rectangular cross section and a yoke consisting of a flexible U-shaped bar having a pair of spaced arms adapted to receive said shank therebetween, said arms being bent inwardly toward each other adjacent the closed end of said bar and adapted to bear against the sides of said shank, said shank and the bent portions of said yoke arms having aligned apertures to receive a connecting bolt, the closed end of said U-shaped bar being arcuate about an axis midway between the inwardly bent portions of said arms and intersecting the axis of said bolt, the edge of said shank being in contact with the inner face of said arcuate portion whereby the swinging of said yoke about the axis of said bolt is restrained.

6. A colter support comprising a shank having flat sides and rounded edges and a yoke consisting of a flexible U-shaped bar having a pair of spaced arms adapted to receive said shank therebetween, said arms having opposed fulcrum-shaped portions adapted to bear against the flat sides of said shank midway between the rounded edges thereof, a cross bracing member disposed between and fixed to the arms of said U-shaped bar, the closed end of said bar and said cross bracing member being arcuate about the axis of said shank and in contact with the rounded edges thereof, said shank and said fulcrum shaped portions having aligned holes adapted to receive a connecting bolt for drawing said fulcrums toward the sides of the shank.

7. A colter support comprising a shank of generally rectangular cross section and a yoke having a pair of spaced flexible arms adapted to receive said shank therebetween and an arcuate portion connecting said arms, said yoke and said shank being connected together for a limited amount of relative lateral swinging, said shank being in contact with said arcuate portion whereby swinging about a transverse axis is restrained, and means for drawing said arms in toward the sides of said shank to regulate the clearance therebetween.

8. A colter support comprising a shank of generally rectangular cross section and a yoke consisting of a U-shaped bar having spaced arms adapted to receive said shank therebetween and an arcuate portion at the closed end thereof, means for connecting said yoke to said shank for a limited amount of lateral swinging relative thereto including inwardly directed portions on said arms adapted to bear against opposite sides of said shank, said shank bearing against said arcuate portion to restrain the yoke against vertical swinging relative thereto.

9. A colter support comprising a shank having parallel flat sides and a yoke having a pair of spaced arms adapted to receive said shank therebetween, means for connecting said yoke to said shank for a limited amount of lateral swinging relative thereto including a pair of opposed fulcrum-shaped portions extending inwardly from said arms and adapted to bear against the flat sides of said shank, said fulcrum-shaped portions and said shank having aligned holes therein to receive a connecting bolt, and means for restraining said yoke against vertical swinging relative to said shank.

10. A colter yoke comprising a U-shaped bar having spaced arms and an arcuate portion at the closed end thereof, said arms having inwardly directed portions adjacent said closed end with aligned holes through the centers of said inwardly directed portions.

11. A colter yoke comprising a U-shaped bar, the arms thereof being depressed inwardly toward each other adjacent the closed end of the bar and having aligned holes in said depressed portions, and a cross brace member disposed between and fixed to the arms of said bar, the closed end of said U-shaped bar and said cross brace member each being arcuate about a point disposed centrally therebetween.

CARL G. STRANDLUND.